US011505745B2

(12) United States Patent
Zhou et al.

(10) Patent No.: US 11,505,745 B2
(45) Date of Patent: Nov. 22, 2022

(54) USE OF ZWITTERION DOPANT IN PREPARATION OF DYNAMIC-SCATTERING-MODE-BASED LIQUID CRYSTAL MATERIAL

(71) Applicants: SHENZHEN GUOHUA OPTOELECTRONICS CO., LTD., Guangdong (CN); ACADEMY OF SHENZHEN GUOHUA OPTOELECTRONICS, Guangdong (CN)

(72) Inventors: Guofu Zhou, Guangdong (CN); Yuanyuan Zhan, Guangdong (CN); Danqing Liu, Guangdong (CN); Albertus Petrus Henricus Johannes Schenning, Eindhoven (NL); Dirk Jan Broer, Eindhoven (NL)

(73) Assignees: SHENZHEN GUOHUA OPTOELECTRONICS CO., LTD., Guangdong (CN); ACADEMY OF SHENZHEN GUOHUA OPTOELECTRONICS, Guangdong (CN)

( * ) Notice: Subject to any disclaimer, the term of this patent is extended or adjusted under 35 U.S.C. 154(b) by 361 days.

(21) Appl. No.: 16/485,999

(22) PCT Filed: Dec. 28, 2018

(86) PCT No.: PCT/CN2018/124576
§ 371 (c)(1),
(2) Date: Aug. 14, 2019

(87) PCT Pub. No.: WO2020/107615
PCT Pub. Date: Jun. 4, 2020

(65) Prior Publication Data
US 2021/0355384 A1 Nov. 18, 2021

(30) Foreign Application Priority Data
Nov. 26, 2018 (CN) .......................... 201811417737.8

(51) Int. Cl.
C09K 19/54 (2006.01)
G02F 1/137 (2006.01)
C09K 19/52 (2006.01)

(52) U.S. Cl.
CPC ........ C09K 19/54 (2013.01); *C09K 2019/528* (2013.01); *G02F 1/13756* (2021.01)

(58) Field of Classification Search
CPC .................................................. C09K 19/54
See application file for complete search history.

(56) References Cited

U.S. PATENT DOCUMENTS

| 3,882,039 A * | 5/1975 | Sprokel ................ C09K 19/582 252/299.2 |
| 4,066,569 A * | 1/1978 | Lim ...................... C09K 19/58 252/299.3 |
| 2003/0071243 A1* | 4/2003 | Sahouani ........... C09K 19/3475 252/299.4 |
| 2011/0253197 A1* | 10/2011 | Mapel ................... H01L 31/055 359/884 |
| 2014/0246632 A1* | 9/2014 | Nakanishi ............... G02B 1/08 252/585 |
| 2014/0311937 A1* | 10/2014 | Adam .................... C09J 133/10 220/359.4 |
| 2015/0146156 A1* | 5/2015 | Hirai ..................... C09K 19/56 349/194 |
| 2019/0353943 A1* | 11/2019 | Smith .................... G02F 1/1323 |
| 2021/0181551 A1* | 6/2021 | Oono ................ G02F 1/133707 |

FOREIGN PATENT DOCUMENTS

| CN | 1304530 C | 3/2007 |
| CN | 101340898 A | 1/2009 |
| CN | 102186643 B | 9/2011 |
| CN | 102634349 A | 8/2012 |
| CN | 102959049 A | 3/2013 |
| CN | 103184053 B | 7/2013 |
| CN | 103429703 B | 12/2013 |
| CN | 103666482 B | 3/2014 |
| CN | 106526932 B | 3/2017 |
| CN | 106526945 B | 3/2017 |
| CN | 107577067 A | 1/2018 |

(Continued)

OTHER PUBLICATIONS

A.I. Baise et al., "Effect of charge-transfer acceptors on dynamic scattering in a nematic liquid crystal," Applied Physics Letters, 21, 142 (1972); Oct. 16, 2003, 3 pages, https://doi.org/10.1063/1.1654317.

George H. Heilmeier et al., "Dynamic Scattering: A New Electrooptic Effect in Certain Classes of Nematic Liquid Crystals," Proceedings of the IEEE, vol. 56, No. 7, Jul. 1968, pp. 1162-1171.

Yoshitake Ohnishi et el., "Properties of nematic liquid crystals doped with hydroquinone and pbenzoquinone: Long-term dynamic scattering under dc excitation," Applied Physics Letters, 24, 213 (1974); Oct. 9, 2003, 5 pages, https://doi.org/10.1063/1.1655157.

First Search for corresponding patent application No. 201811417737.8, dated Dec. 13, 2019, 2 pages.

(Continued)

Primary Examiner — Chanceity N Robinson
(74) Attorney, Agent, or Firm — Tucker Ellis LLP; Heather M. Barnes

(57) ABSTRACT

A use of zwitterionic compound in preparation of dynamic-scattering-mode-based liquid crystal material. A liquid crystal material is also described. Such material contains liquid crystal and dopant, and the dopant is zwitterionic compound. A liquid crystal electro-optical device comprising such liquid crystal compound and the use of such optical device are also described. Zwitterionic compound is used as dopant to induce a stable dynamic scattering mode in liquid crystals.

6 Claims, No Drawings

(56) References Cited

FOREIGN PATENT DOCUMENTS

CN   108227271 B   6/2018
CN   108761880 A   11/2018

OTHER PUBLICATIONS

Zhan, Yuanyuan et al., "Light-Driven Electrohydrodynamic Instabilities in Liquid Crystals," Advanced Functional Materials, www.afm-journal.de, 2018, 1707436, 7 pages, <DOI: 10.1002/adfrm.201707436.>.

Professor Li Qiang, "Design and Evaluation of Functional Zwitterionic Ionic Liquids Self-assemblies," Shandong University, Mar. 25, 2017, 156 pages.

* cited by examiner

USE OF ZWITTERION DOPANT IN PREPARATION OF DYNAMIC-SCATTERING-MODE-BASED LIQUID CRYSTAL MATERIAL

CROSS-REFERENCE TO RELATED APPLICATIONS

This application is a national phase application of International Application No. PCT/CN2018/124576, filed Dec. 28, 2018, which claims priority to CN 201811417737.8, filed Nov. 26, 2018, all of which are hereby incorporated herein by reference.

TECHNICAL FIELD

The present disclosure relates to use of zwitterion dopant in preparation of dynamic-scattering-mode-based liquid crystal material, and in general, relates to electro-optical technology.

BACKGROUND

Dynamic scattering mode (DSM), in literature also named electrohydrodynamic instabilities (EHDI), was first discovered in liquid crystals and reported in the 1960s. It was initially used to produce scattering-based monitors, with following conditions being met to generate the DSM effect: (1) Liquid crystals (LC) demonstrate negative dielectric anisotropy. (2) Liquid crystals are initially homeotropically aligned (with a direction of being perpendicular to the substrate). (3) Charge carriers in the form of ions are in liquid crystals, therefore increasing conductivity of the LC, reducing the threshold voltage and generating turbulent flow motion in LC.

A typical DSM device comprises a liquid crystal cell which can be configured in isotropic alignment. LC mixture with ions are filled in this cell. LC is isotropic and demonstrate high light transmittance with no electric field applied. With electric field applied across the LC cell, LC with negative dielectric anisotropy realign to a planar orientation. Meanwhile, the mobile charge carriers start oscillating under the influence of the AC field generating chaotic turbulence. Consequently, the LC strongly scatters light. Heilmeier et. al were the first to present this phenomenon in Proc. IEEE, vol. 56, pp. 1162-1171, 1968. In this publication, the authors used APAPA (anisylidene para-aminophenylacetate) to demonstrate DSM effect. Charge-carrying impurities intrinsically exist in the APAPA and therefore light is scattered when an electric field is applied to the LC.

However, in a pure LC mixture, additional dopant is necessary. Efforts have been devoted in seeking a proper dopant for the LC mixture. Using salt dopant as a conventional method would lead to a high driving voltage. Baise et. published an article in Appl. Phys. Lett. 21. 142 (1972), where they proposed to use charge-transfer acceptors to lower the threshold voltage. However, the proposal has not improved the lifetime of the DSM. In another known work published in Appl. Phys. Lett. 24, 213 (1974), the authors showed that using mixture of charge-transfer complex as dopant could extend the lifetime of the DSM. However, the mixture showed poor dynamic scattering efficiencies when normal working current was applied to it. Upon that, using redox dopant was disclosed by Lim Hong Sup in U.S. Pat. No. 4,066,569 (A) in 1978. The dopant lowered the driving voltage and enabled relatively longer lifetime with a strong scattering efficiency at 98%. However, the dopant could only mix with LC at an elevated temperature around 60° C., which greatly limited its feasible application at room temperature.

In the existing art, there is a need to deal with intrinsic instability of the DSM device. On one hand, ions need to be added into the LC system to induce rotational flow formed by the field responsive instability in the LC. On the other hand, the ions are charged, thus the ions accumulate near the electrodes in a continuous field and ultimately cause the device fail. The permanent electrical field can induce the device to maintain a closed (scattering) state. Moreover, permanent potentials could be formed by ions themselves when the positive and negative ions accumulate at opposite electrodes. In the LC system, these ions are added as salt bonded together but would soon separate in various phases, and this is especially obvious when an electric field is switched on.

With respect to known tonal light devices with inert dye molecule doped, the transmittivity variation of the device is no more than 50% and response frequency ranges from a narrow selection from 50 Hz to 1000 Hz due to the doped dye molecule being non-ionic molecule in the LC system; and phase separation occurs easily when the system is in high concentration of dye molecule, leading to a nonuniform degree of light scattering of the device.

SUMMARY

The research and applications on the DSM-based monitors were ceased in 1970s due to the instability and short lifetime of the devices induced by the presence of ion impurities and ion dopant. According to the present disclosure, new charge dopant is provided in liquid crystals having negative dielectric anisotropy, demonstrating a longer lifetime of DSM as compared to known dopant.

Dopant in the present disclosure is based on zwitterions. Therefore, using zwitterions dopant in preparation of DSM-based liquid crystal is described herein.

Zwitterions dopant as such has two or more functional groups, at least one of which has a positive electric charge and the other one has a negative electric charge. They both demonstrate cationic and anionic states. Charges on different functional groups balance each other out, and the molecule itself is electrically neutral. For example, a typical zwitterionic compound may be amino acid which contains both acidic (carboxylic acid group) and alkaline (amine group) centers:

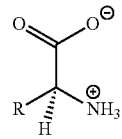

Due to presence of electrical neutrality, zwitterion dopant overcome the drawbacks of the conventional salt dopant and increase the lifetime of DSM-based optical devices.

Optionally, zwitterion dopant as such is at least one of the followings: phenolic, pyridine, betaine and sulfonate.

Optionally, zwitterion dopant as such is at least one of the following: a phenolsulfonphthalein-type zwitterionic compound, a phenylpyridine-type zwitterionic compound, an alkylbetaine-type zwitterionic compound, or an aromatic sulfonate-type zwitterionic compound. Furthermore, zwitterions dopant as such may be a derivative type on the above zwitterionic compound, for example, the alkylbetaine-type zwitterionic compound may be selected from alkyl sulfo betaines, and further selected from alkyl sulfo propyl betaines; the alkylbetaine-type zwitterionic compound may be selected from alkyl amide betaines; and the phenylpyridine-type zwitterionic compound may be a triphenylpyridine-type zwitterionic compound.

Furthermore, zwitterions dopant as such may be at least one of the followings: phenol red, 2,6-diphenyl-4-(2,4,6-triphenyl-1-pyridinio), 5-amino-2-naphthalenesulfonic acid, 3-(triphenyl phosphorus) propane-1-sulfonate, betaine (trimethylglycine), dodecyl betaine, lauryl betaine, decyl sulfopropyl betaine, dodecyl sulfopropyl betaine, tetradecyl sulfopropyl betaine, cetyl sulfopropyl betaine, octadecyl sulfopropyl betaine, lauramidopropyl betaine, cocamidopropyl betaine, octadeca-acylamino propyl betaine.

Optionally, zwitterions dopant as such may be selected from one of the following structural compounds:

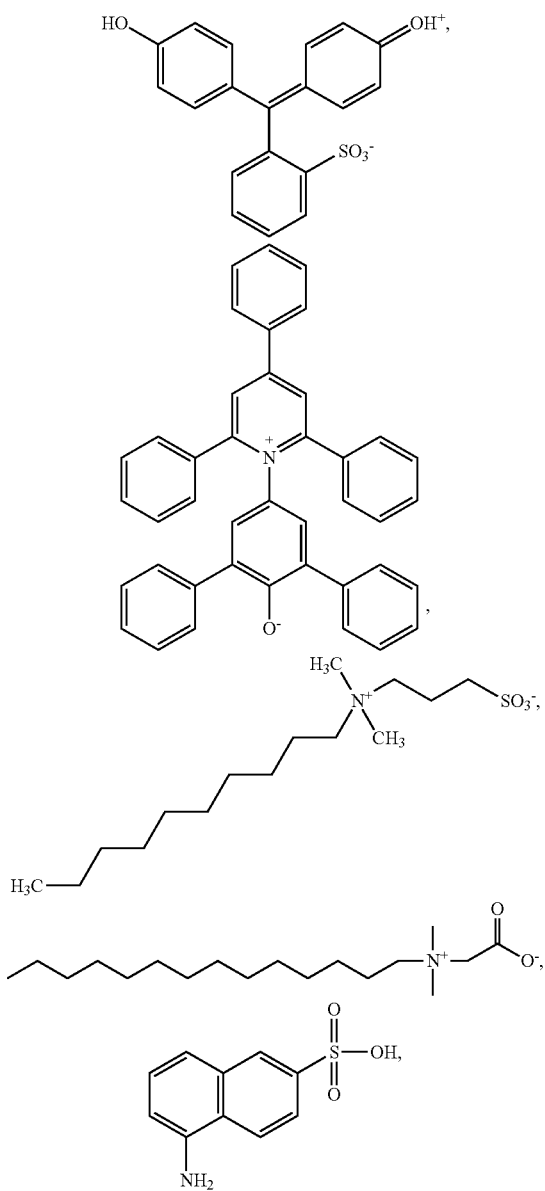

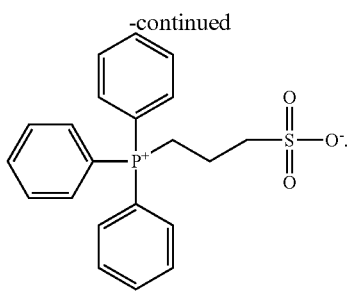

A liquid crystal material is also described herein, containing liquid crystal and dopant selected from the aforementioned zwitterionic compounds.

Optionally, the liquid crystal in such material possesses negative dielectric anisotropy perpendicular to the applied electric field. Such liquid crystal with negative $\Delta\varepsilon$ can be used in business such as MBBA (p-methoxybenzylidene-p-n-butylaniline.

Optionally, zwitterions dopant contained in such LC material are in a concentration between 0.001 wt % and 10 wt %; optionally, zwitterions dopant contained in such LC material are in a concentration between 0.05 wt % and 2 wt %.

The liquid crystal material described herein can perform stable and long-lasting DMS effect.

A liquid crystal electro-optical device based on electro-hydrodynamic is described, comprising the aforementioned LC material.

Further, the electro-hydrodynamic-based liquid crystal electro-optical device can switch freely between transparent state and light scattering state.

Optionally, a liquid crystal electro-optical device as such is driven by a voltage between 1V to 100V; optionally, an electro-hydrodynamic-based liquid crystal electro-optical device as such is driven by a voltage between 10V to 50V.

Further, such liquid crystal electro-optical device is driven by AC voltage or DC voltage.

Optionally, such liquid crystal electro-optical device is driven at a frequency of 30 Hz to 15 kHz.

Optionally, such electro-hydrodynamic-based liquid crystal electro-optical device comprises a LC cell which is filled with LC material of LC and zwitterions dopant.

Optionally, the LC cell is presented at a thickness from 5 μm to 50 μm.

Explanation and illustration in regard of the electro-hydrodynamic-based liquid crystal electro-optical device are as follows: the electro-optical device includes two transparent substrates and LC material. Each transparent substrate includes transparent glass substrate, ITO conductive layer and orientation-inducing layer, and all these components are sequentially disposed from exterior to interior. The orientation-inducing layers of the transparent substrates are disposed opposite to each other, forming a regulatory area between the two light-transmitting substrates, LC material is filled in such regulatory area. Each ITO electrode from each ITO conductive layer connects respectively to one of the two electrodes of external AC power supply; when two electrodes are energized, an electric field is generated between the two light-transmitting substrates, and the magnitude of the electric field is related to the voltage applied to the ITO electrodes. Before a voltage is applied to the liquid crystal electro-optical device, zwitterions dopant disperses in LC molecule which presents a specific orientation under the influence of the (surface) orientation-inducing layer, therefore the device is transparent. And after a voltage is applied to the device, the LC molecules realign under the influence of the applied electric field, turning the transparent liquid crystal electro-optical device into a light-scattering one but with partial light shielded. Meanwhile, zwitterionic compound serving as dopant in the LC system oscillates between two electrodes, disrupting the original sequence of LC molecules in the LC cell. The LC molecules realign, from a specific orientation to chaos, and therefore scatters incident light from visual spectral band. Structure and preparation process of the electro-hydrodynamic-based liquid crystal electro-optical device in the disclosure may be referred to Patent No. CN107577067A.

The electro-hydrodynamic-based liquid crystal electro-optical device described herein is an optical device which can be switched from transparent mode to light scattering mode under applied voltage. Such liquid crystal electro-optical device can be used in preparation of intelligent house and/or display device. In particular, such device can apply to light-controlled switches, monitors, electronic control dimming windows, projection screens, and screens for privacy or optical storage devices that block strong radiation. For example, it may also serve the purpose of protecting privacy and apply to products that shield visible light in scattering mode.

By doping a zwitterionic compound in liquid crystal, ions of the zwitterionic compound move between the two electrodes under the influence of an external electric field, disrupting sequence of the realigned LC molecules, and subsequently generate turbulent flow motion in the LC. In this way, the device is switched from transparent mode to non-transparent mode under which light scatters.

Zwitterion is used as dopant to induce a stable dynamic scattering mode in liquid crystals in the present disclosure. The zwitterionic compound is a type of molecule that carries positive and negative electric charges and the net charge of the entire molecule is zero. Due to the charge neutrality, it's possible to solve a problem that dopant shows good DSM characteristics but with low threshold voltage.

According to several aspects of the present disclosure:

1) The dopant used in the existing art exhibit phase separation, and become miscible at elevated temperature. The zwitterions according to the present disclosure can be easily mixed with LC at room temperature, reducing probability of phase separation.

2) The hydrodynamic effect can be obtained by dopant in the existing art through two stages: ion-triggering of 100 ms and generating turbulent flow motion in 1 s. There is only one stage for zwitterion dopant, it only takes 100 ms from applying the voltage to forming turbulent flow motion.

3) As a major factor that shortens the lifetime of DSM in the existing art, salt based dopant will accumulate either at the positive or negative electrode under the DC voltage after long operating time. The zwitterionic compound in the present disclosure will not accumulate at electrodes after long operating hours, therefore increasing the lifetime of the DSM based devices.

4) Dopant in the existing art may spontaneously form ion aggregates in broad size and shape distributions, especially in solutions of high concentration of dopant. However, the zwitterionic compound in the present disclosure is difficult to aggregate and thus increases the lifetime of the LC.

5) When an electric field is applied to the zwitterion-doped LC system, electro-hydrodynamic effect is formed with response frequency ranging from a wide selection from 30 Hz to 15 kHz.

6) The specific molecule structure of zwitterion that positive and negative charges existing at one single molecule enables the electro-hydrodynamic effect being driven by the device under an electric field, exhibiting light scattering at the macro level with a transmittivity variation of over 80%.

DETAILED DESCRIPTION

As used herein, the term "and/or" includes any and all combinations of one or more of the associated listed items. The terminology used herein is for the purpose of describing particular implementations only and is not intended to be limiting of the present disclosure. As used herein, the singular forms "a", "an" and "the" are intended to include the plural forms as well, unless the context clearly indicates otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The methods and processes described illustratively herein suitably may be practiced in differing orders of steps, and that they are not necessarily restricted to the orders of steps indicated herein or in the claims. Unless specified otherwise, the terms "comprising" and "comprise", and grammatical variants thereof, are intended to represent "open" or "inclusive" language such that they include recited elements but also permit inclusion of additional, unrecited elements. The terms and expressions which have been employed are used as terms of description and not of limitation, and there is no intention that in the use of such terms and expressions of excluding any equivalents of the features shown and described or portions thereof, but it is recognized that various modifications are possible within the scope of the disclosure claimed. Although the present disclosure has been described herein by way of several implementations, it is not limited thereto but can be modified in a variety of ways.

Although the disclosure has been described with specific exemplary implementations, it is quite obvious that it is in no way limited thereto and that it comprises all the technical equivalents of the means described and combinations thereof if these come within the scope of the disclosure. This includes the generic description of the disclosure with a proviso or negative limitation removing any subject matter from the genus.

The examples below are non-limiting and are merely representative of various aspects and features of the present disclosure. In addition, where features or aspects of the disclosure are described in terms of Markush groups, those skilled in the art will recognize that the disclosure is also thereby described in terms of any individual member or subgroup of members of the Markush group.

The concept, the specific contents, and the technical effects of the present disclosure are clearly and completely described in the following detailed description of the present disclosure to fully understand the objects, features and effects of the present disclosure. It is apparent that the described implementations are only a part of the implementations of the present disclosure, and not all of the embodiments, based on the embodiments of the present disclosure, other implementation obtained by those skilled in the art without creative efforts belong to the scope of protection of the present disclosure. The raw materials used in the examples can be obtained from a conventional commercial route unless otherwise specified. The preparation methods described in the examples are all conventional methods in the art unless otherwise specified.

Implementation 1

Liquid crystal material of implementation 1 can be obtained by: mixing 99.7 wt % of liquid crystal with 0.3 wt % of zwitterion (as indicated by structural formula 1); heating the composite of the liquid crystal and the zwitterion to 100° C. and stirring. The liquid crystal used here can be purchased from HCCH, HNG 30400-200, wherein $\Delta\varepsilon=-8.3$, $T_{N-I}=94°$ C.

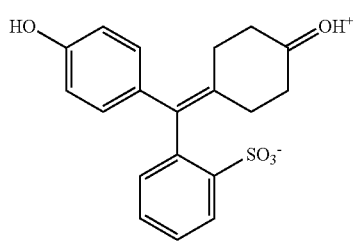

Formula 1

The resulting liquid crystal material of implementation 1 is filled in a LC cell coated with tin oxide electrodes with a thickness of 10 μm at isotropic phase by capillary suction, forming the DSM device with zwitterions dopant of implementation 1. Tests are conducted when the device cools down to room temperature gradually. According to the test, a threshold voltage is 10V (1V/m), a driving voltage is 50 V (5V/m), a driving frequency of 50 Hz, a working temperature at 25° C. and a working humidity of below 40%.

Implementation 2

Liquid crystal material of implementation 2 can be obtained by: mixing 99.7 wt % of liquid crystal with 0.3 wt % of zwitterion (as indicated by structural formula 2); heating the composite to 100° C. and stirring. The liquid crystal used here can be purchased from HCCH, HNG 30400-200, wherein $\Delta\varepsilon=-8.3$, $T_{N-I}=94°$ C.

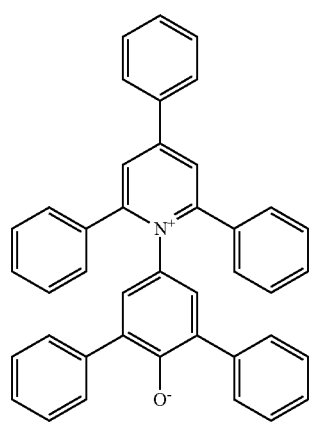

Formula 2

The resulting liquid crystal material of implementation 2 is filled in a LC cell coated with tin oxide electrodes with a thickness of 10 μm at isotropic phase by capillary suction, forming the DSM device with zwitterions dopant of implementation 2. Tests are conducted when the device cools down to room temperature gradually. According to the test, a threshold voltage is 10V (1V/m), a driving voltage is 20 V (2V/m), a switching on time at approximately 100 ms, an off time at approximately 100 ms, a lifetime of over 6300 hours, a working temperature at 25° C. and a working humidity of below 40%.

Implementation 3

Liquid crystal material of implementation 3 can be obtained by: mixing 99.7 wt % of liquid crystal with 0.3 wt % of zwitterion (as indicated by structural formula 3); heating the composite to 100° C. and stirring. The liquid crystal used here can be purchased from HCCH, HNG 30400-200, wherein $\Delta\varepsilon=-8.3$, $T_{N-I}=94°$ C.

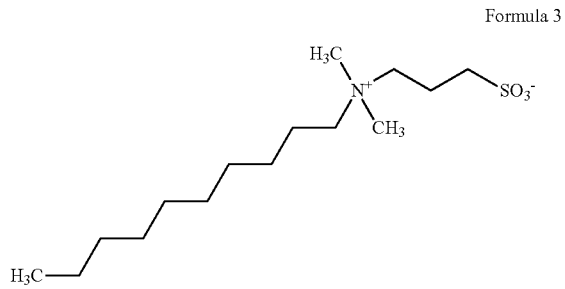

Formula 3

The resulting liquid crystal material of implementation 3 is filled in a LC cell coated with tin oxide electrodes with a thickness of 10 μm at isotropic phase by capillary suction, forming the DSM device with zwitterions dopant of implementation 3. Tests are conducted when the device cools down to room temperature gradually. According to the test, a threshold voltage is 10V (1V/m), a driving voltage is 30 V (3V/m), a driving frequency of 50 Hz, a working temperature at 25° C. and a working humidity of below 40%.

Implementation 4

Liquid crystal material of implementation 4 can be obtained by: mixing 99.7 wt % of liquid crystal with 0.3 wt % of zwitterion (as indicated by structural formula 4); heating the composite to 110° C. and stirring. The liquid crystal used here can be purchased from HCCH, HNG 30400-200, wherein $\Delta\varepsilon=-8.3$, $T_{N-I}=94°$ C.

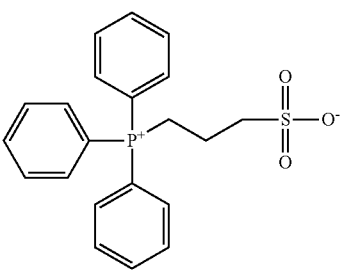

Formula 4

The resulting liquid crystal material of implementation 4 is filled in a LC cell coated with tin oxide electrodes with a thickness of 10 μm at isotropic phase by capillary suction, forming the DSM device with zwitterions dopant of implementation 4. Tests are conducted when the device cools down to room temperature gradually. According to the test, a threshold voltage is 30V, a driving voltage is 30 V, a driving frequency of 110 Hz, light transmittance approximately at 80%, can be continuously switched for over 70000 times, a working temperature at 25° C. and a working humidity of below 40%.

Implementation 5

Liquid crystal material of embod-implementation iment 5 can be obtained by: mixing 99.7 wt % of liquid crystal with 0.3 wt % of zwitterion (as indicated by structural formula 5); heating the composite to 110° C. and stirring. The liquid crystal used here can be purchased from HCCH, HNG 30400-200, wherein $\Delta\varepsilon=-8.3$, $T_{N\text{-}I}=94°$ C.

Formula 5

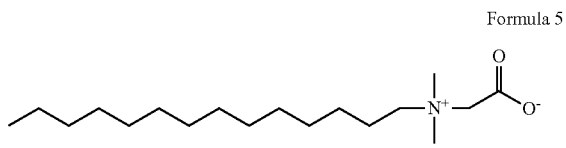 [SMILES: CCCCCCCCCCCCCC[N+](C)(C)CC(=O)[O-]]

The resulting liquid crystal material of implementation 5 is filled in a LC cell coated with tin oxide electrodes with a thickness of 10 μm at isotropic phase by capillary suction, forming the DSM device with zwitterions dopant of implementation 5. Tests are conducted when the device cools down to room temperature gradually. According to the test, a threshold voltage is 25V, a driving voltage is 30 V, a driving frequency of 80 Hz, light transmittance reduces to 65%, and the device can be continuously switched for over 70000 times, a working temperature at 25° C. and a working humidity of below 40%. Light transmittance reaches approximately 68% when the device operates at 40° C.

Implementation 6

Liquid crystal material of implementation 6 can be obtained by: mixing 99.7 wt % of liquid crystal with 0.3 wt % of zwitterion (as indicated by structural formula 6); heating the composite to 110° C. and stirring. The liquid crystal used here can be purchased from HCCH, HNG 30400-200, wherein $\Delta\varepsilon=-8.3$, $T_{N\text{-}I}=94°$ C.

Formula 6

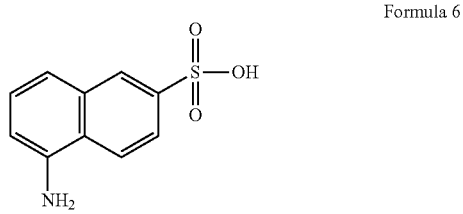 [SMILES: Nc1cccc2cc(S(=O)(=O)O)ccc12]

The resulting liquid crystal material of implementation 6 is filled in a LC cell coated with tin oxide electrodes with a thickness of 10 μm at isotropic phase by capillary suction, forming the DSM device with zwitterions dopant of implementation 6. Tests are conducted when the device cools down to room temperature gradually. According to the test, a threshold voltage is 25V, a driving voltage is 30 V, a driving frequency of 120 Hz, light transmittance reduces to 71%, and the device can be continuously switched for over 70000 times, a working temperature at 25° C. and a working humidity of below 40%.

Comparative Implementation

A comparison is conducted between conventional DSM devices using normal ionic compound and DSM devices doped with zwitterionic compounds.

Liquid crystal of the comparative implementation can be obtained by: mixing 99.95 wt % of liquid crystal with 0.05 wt % of compound (as indicated by structural formula 7). The liquid crystal used in this comparative implementation can be purchased from HCCH, HNG 30400-200, $\Delta\varepsilon=-8.3$, $T_{N\text{-}I}=94°$ C. Compound shown by structural formula 7 is ionic material used in conventional DSM device and can be purchased from Sigma-Aldrich.

Formula 7

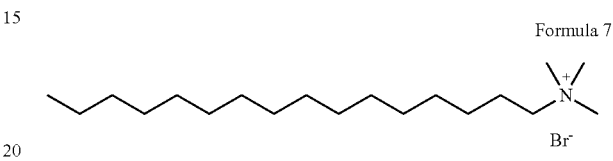

After a LC cell having a size of 9×9 cm is filled with the liquid crystal obtained in the comparative implementation, such conventional DSM device exhibits phase separations. After heating the device from 25° C. to 90° C., the device cannot be switched to scattering state.

Several implementations are described above, but the present disclosure are not limited thereto. Any changes, modification, substitution, combination, simplification within the scope and principle of the present disclosure should be regarded as equivalent variation of the present disclosure (for example, use other zwitterionic compounds as dopant) and therefore fall within the scope of protection of the present disclosure.

The invention claimed is:

1. A liquid crystal material, comprising:
   a host liquid crystal, wherein the host liquid crystal demonstrates negative dielectric anisotropy; and
   a zwitterion dopant, wherein the zwitterion dopant is at least one selected from the group consisting of phenol red, 2,6-diphenyl-4-(2,4,6-triphenyl-1-pyridinio), 5-amino-2-naphthalenesulfonic acid, and 3-(triphenyl phosphorus) propane-1-sulfonate.

2. The liquid crystal material according to claim 1, wherein the zwitterion dopant in the liquid crystal material is in a concentration between 0.001 wt % and 10 wt %.

3. A liquid crystal electro-optical device based on electro-hydrodynamic, comprising the liquid crystal material according to claim 1.

4. The liquid crystal electro-optical device according to claim 3, wherein the device is driven by a voltage between 1V and 100 V.

5. The liquid crystal electro-optical device according to claim 3, wherein the device is driven by a frequency between 30 Hz and 15 kHz.

6. A display device, comprising the liquid crystal electro-optical device based on electro-hydrodynamic according to claim 3.

* * * * *